US011162457B2

(12) United States Patent
Sachdeva et al.

(10) Patent No.: US 11,162,457 B2
(45) Date of Patent: Nov. 2, 2021

(54) TURBINE FAN SYSTEM AND METHOD (71) Applicant: General Electric Company, Schenectady, NY (US)

(72) Inventors: Deepika Sachdeva, Bangalore (IN); Mohammad Kashfuddoja, Bangalore (IN); Anshul Kaushik, Bangalore (IN); Mark Alan Rhoads, Cincinnati, OH (US); Andrew Jenkins, Nantgarw (GB)

(73) Assignee: General Electric Company, Schenectady, NY (US)

( * ) Notice: Subject to any disclaimer, the term of this patent is extended or adjusted under 35 U.S.C. 154(b) by 427 days.

(21) Appl. No.: 15/674,570

(22) Filed: Aug. 11, 2017

(65) Prior Publication Data
US 2019/0048825 A1 Feb. 14, 2019

(51) Int. Cl.
*F02K 3/06* (2006.01)
*F01D 25/00* (2006.01)
*F04D 29/063* (2006.01)

(52) U.S. Cl.
CPC .............. *F02K 3/06* (2013.01); *F01D 25/007* (2013.01); *F04D 29/063* (2013.01); *F05D 2220/36* (2013.01); *F05D 2230/90* (2013.01); *F05D 2240/61* (2013.01); *F05D 2260/609* (2013.01); *F05D 2260/98* (2013.01); *F05D 2300/509* (2013.01); *F05D 2300/611* (2013.01)

(58) Field of Classification Search
CPC .......... F05D 2260/98; F05D 2260/608; F05D 2300/611; F05D 2300/509; F05D 2240/61; F05D 2230/90; F05D 2220/36; F01D 25/007; F01D 5/026; F01D 25/32; F02K 3/06; F02K 29/053; F02K 29/023; F02C 7/06; F04D 29/023; F04D 29/053
See application file for complete search history.

(56) References Cited

U.S. PATENT DOCUMENTS

| 2,664,268 | A | * | 12/1953 | Howard | F01D 21/04 |
| | | | | | 415/175 |
| 3,528,241 | A | * | 9/1970 | Gill, Jr. | F01D 25/18 |
| | | | | | 60/39.08 |
| 5,537,814 | A | * | 7/1996 | Nastuk | F01D 5/066 |
| | | | | | 60/796 |
| 7,004,725 | B2 | | 2/2006 | Vache et al. | |
| 7,516,547 | B2 | | 4/2009 | McCann et al. | |

(Continued)

FOREIGN PATENT DOCUMENTS

EP    0516388 A2    12/1992
FR    2 901 313 A1    11/2007
(Continued)

OTHER PUBLICATIONS

Extended European Search Report and Opinion issued in connection with corresponding EP Application No. 18188456.0 dated Jan. 4, 2019.

(Continued)

*Primary Examiner* — Courtney D Heinle
*Assistant Examiner* — Danielle M. Christensen
(74) *Attorney, Agent, or Firm* — Dority & Manning, P.A.

(57) ABSTRACT

A fan system of a turbine includes a fan mid shaft made of a coated steel material configured to extend along a center axis of a turbine. The fan mid shaft having an inner diameter surface. The fan system includes a dry film lubricant that is configured to be applied to at least a portion of the inner diameter surface of the fan mid shaft.

20 Claims, 7 Drawing Sheets

(56) References Cited

U.S. PATENT DOCUMENTS

| | | | |
|---|---|---|---|
| 7,666,515 B2* | 2/2010 | Nagaraj | C23C 18/1208 428/469 |
| 7,842,403 B2* | 11/2010 | Meyer, Jr. | C23C 22/53 428/686 |
| 8,209,834 B2* | 7/2012 | Mons | F01D 5/085 29/281.1 |
| 9,605,677 B2 | 3/2017 | Heidecker et al. | |
| 10,001,022 B2* | 6/2018 | Strock | F01D 11/003 |
| 10,557,351 B2 | 2/2020 | Amano | |
| 2006/0222884 A1* | 10/2006 | Nagaraj | C23C 18/1208 428/688 |
| 2010/0307430 A1 | 12/2010 | Petelot et al. | |
| 2011/0159175 A1* | 6/2011 | Groh | C23C 22/74 427/142 |
| 2011/0211965 A1 | 9/2011 | Deal et al. | |
| 2016/0290150 A1* | 10/2016 | Strock | F01D 11/003 |
| 2018/0128180 A1 | 5/2018 | Durand et al. | |

FOREIGN PATENT DOCUMENTS

| | | |
|---|---|---|
| JP | H1075551 A | 3/1998 |
| KR | 101570665 B1 | 11/2015 |
| WO | 2011103551 A1 | 8/2011 |

OTHER PUBLICATIONS

Thaddeus et al., "Jet Engines and Propulsion Systems For Engineers", GE Aircraft Engines, https://www.scribd.com/doc/14685278/Jet-Engines-Engine, pp. 5-52, 7-10, 7-18, 1989.

Norris, "NTSB Suspects Fan Mid-Shaft Failure In GEnx-1B Incident", Aviation Week Network, http://aviationweek.com/awin-featured-story/ntsb-suspects-fan-mid-shaft-failure-genx-1b-incident, Aug. 8, 2012.

"B787 GEnx Fan Shaft Failure", Aerossurance, http://aerassurance.com/safety-management/b787-genx-fan-shaft-failure/, Sep. 14, 2015.

\* cited by examiner

TURBINE FAN SYSTEM AND METHOD

FIELD

The subject matter described herein relates to turbines.

BACKGROUND

A fan mid shaft assembly of a turbine includes the installation titanium central vent tube support rings that are disposed in a forward section, mid-section, and aft-section of the fan mid shaft, respectively. The supports are integral in maintaining a position of a central vent tube that extends within the fan mid shaft between a fan and a low-pressure turbine. The central vent tube may provide a pathway between the fan and the low-pressure turbine in order to remove the exhaust of leaked oil from the turbine. As the need increases for turbines to produce greater amounts of thrust, the fan mid shaft is subjected to increasing operating temperatures, rotational speeds, forces, and loads.

One issue with known fan mid shaft assemblies is scratches or cracks that may be formed in the coating system of the shaft bore when the supports are installed into the fan mid shaft. Under increasing temperatures, forces, and loads, these coating defects (e.g., cracks, scratches, or the like) that are formed may grow until the fan mid shaft has a material failure. Additionally, in the presence of any leaked lubricant oil from the central vent tube (e.g., oil may become acidic at increasing temperatures and prolonged exposure), the coating defects may become local and/or general sites of corrosion initiation. These coating defects that are formed on the inner diameter surface of the shaft leave the steel material of the shaft exposed. The increasing temperature values of the turbine, increasing loads and forces on the shaft, and the presence of acidic environments also promote the growth of galvanic corrosion on the shaft at different locations along the shaft. The presence and growth of coating defects, corrosion sites and galvanic corrosion may reduce part life of the fan mid shaft assembly below acceptable levels, which may lead to increasing maintenance costs or potential catastrophic failure. Therefore, an improved coating system for a fan system may improve the durability of the fan system, and thereby reduce scratch formation and mitigate galvanic corrosion.

BRIEF DESCRIPTION

In one embodiment, a fan system of a turbine includes a fan mid shaft made of a coated steel material configured to extend along a center axis of a turbine. The fan mid shaft having an inner diameter surface. The fan system includes a dry film lubricant that is configured to be applied to at least a portion of the inner diameter surface of the fan mid shaft.

In one embodiment, a method includes applying a dry film lubricant to at least a portion of an inner diameter surface of a fan mid shaft that extends along a center axis of a turbine. The fan mid shaft is configured to be made of a coated steel material. The dry film is configured to one or more of prevent scratch formation on the inner diameter surface of the shaft or mitigate galvanic corrosion on the inner diameter surface of the shaft.

In one embodiment, a fan system of a turbine includes a fan mid shaft made of a coated steel material configured to extend along a center axis. The fan mid shaft has an inner diameter surface. The fan system includes a central vent tube that is configured to be inserted into the shaft to a position, wherein the position of the central vent tube is configured to be maintained by one or more supports that are disposed at one or more positions within the shaft along the center axis. The fan system includes a dry film lubricant that is applied to at least a portion of the inner diameter surface of the fan mid shaft.

BRIEF DESCRIPTION OF THE DRAWINGS

The present inventive subject matter will be better understood from reading the following description of non-limiting embodiments, with reference to the attached drawings, wherein below.

DETAILED DESCRIPTION

One or more embodiments of the inventive subject matter described herein relates to systems and methods that reduce a depth of a scratch that may be formed on an inner diameter surface of a fan mid shaft during the installation of a central vent tube support by applying a dry film lubricant to the inner diameter surface of a coated steel material of the fan mid shaft. For example, the dry film lubricant may provide a low coefficient of friction between the supports and the shaft, thereby preventing the formation of axial assembly scratches or cracks.

One or more embodiments of the inventive subject matter described herein relates to system and methods that mitigate galvanic corrosion to the fan mid shaft. For example, anti-corrosion coating that is applied to the steel shaft may be a porous material that provides a pathway for electrolytes to access the underlying steel substrate of the shaft. In an acidic environment, the coating may not dissolve which allows the electrolytes to attack and corrode the underlying steel. A hydrophobic dry film lubricant that is applied to the inner diameter surface of the coated steel material of the fan mid shaft provides a hermetic seal on the porous anti-corrosion coating thereby preventing any electrolyte ingress through the coating and preventing steel shaft corrosion.

Figure 1:
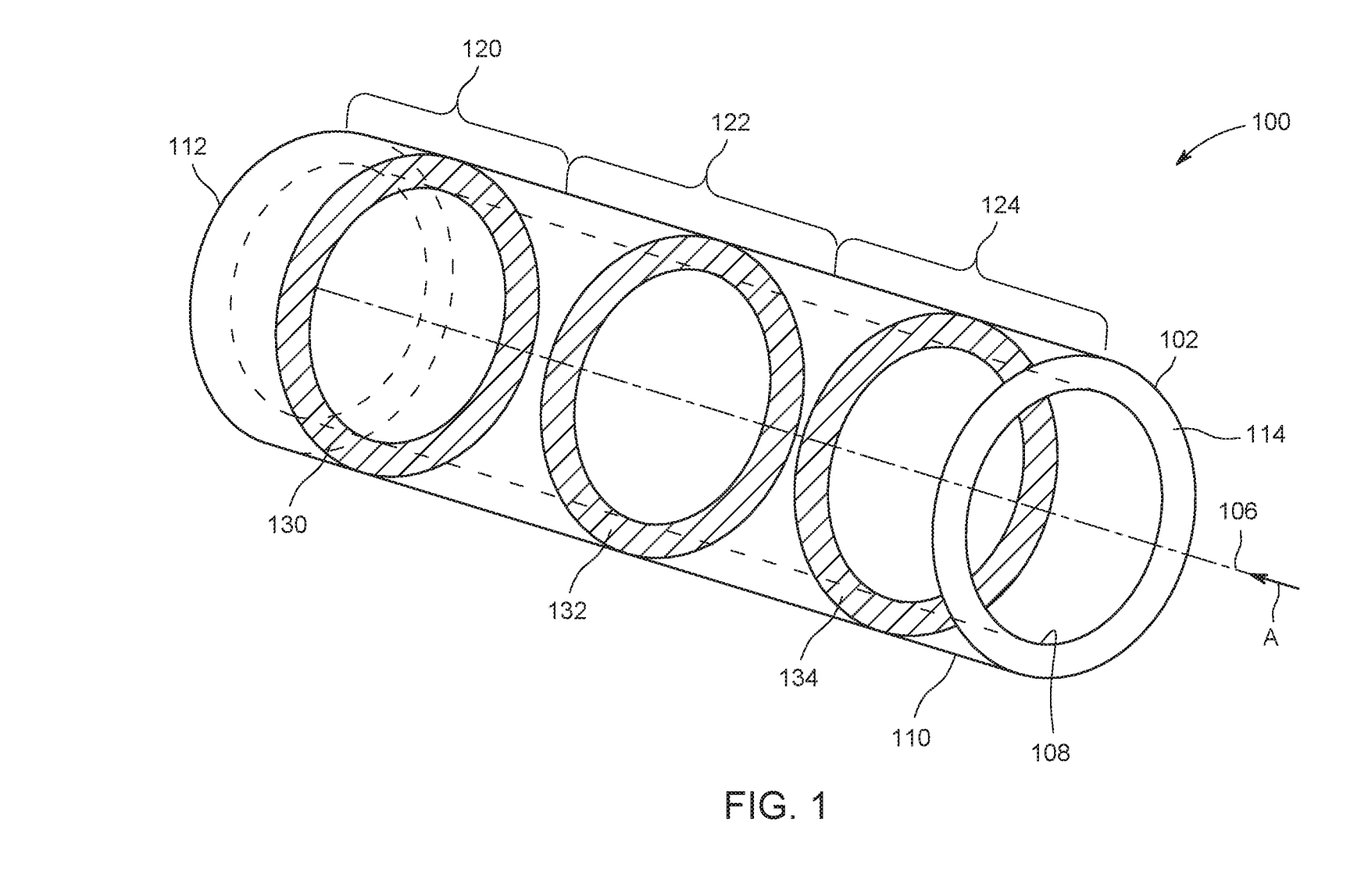
FIG. 1 illustrates a perspective view of a fan mid shaft of a fan system in accordance with one embodiment.
Figure 2:
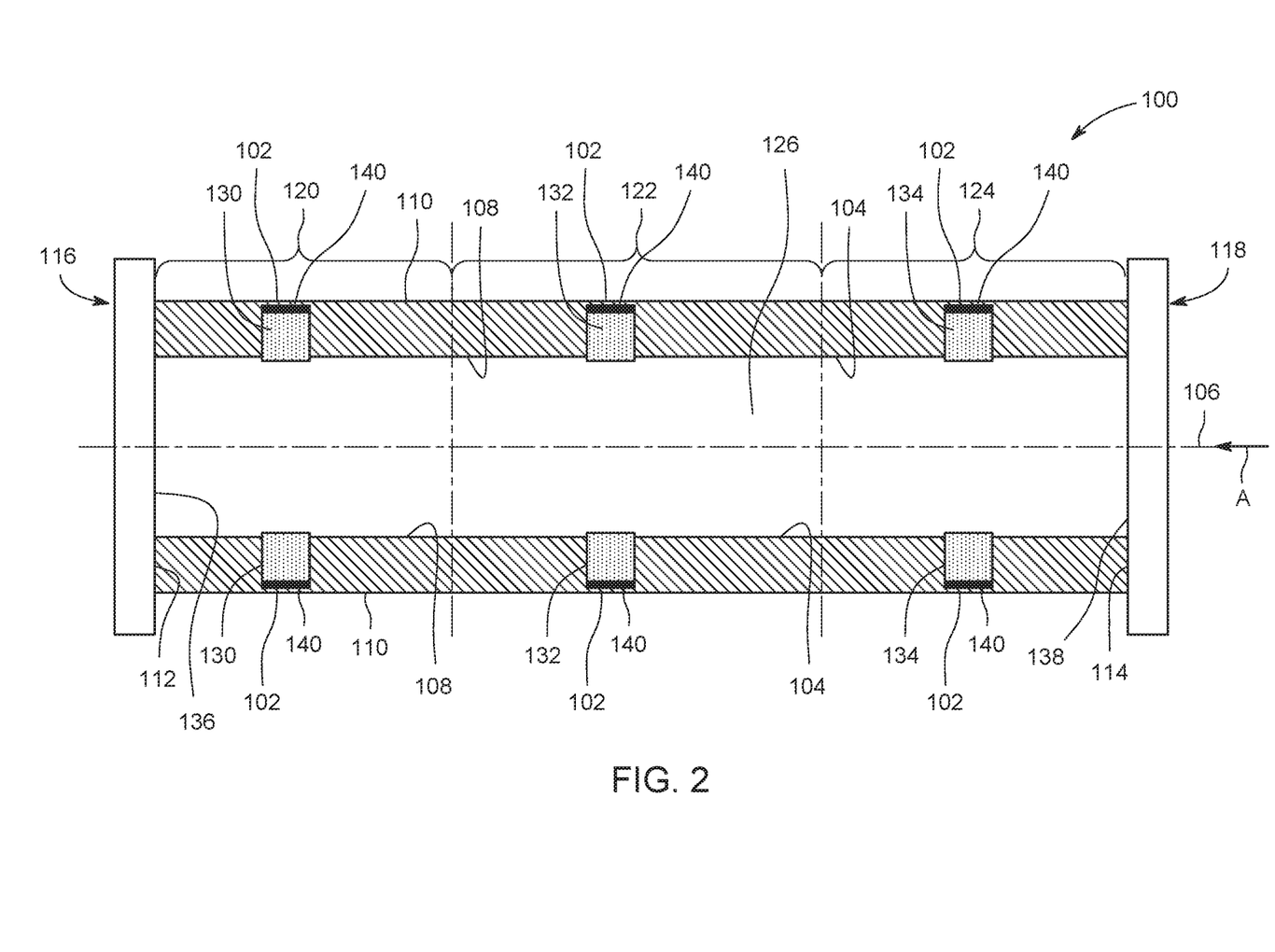
FIG. 2 illustrates a cross-sectional view of the fan system of FIG. 1 in accordance with one embodiment.

FIG. 1 illustrates a perspective view of a fan system 100 in accordance with one embodiment. FIG. 2 illustrates a cross-sectional view of the fan system 100 in accordance with one embodiment. FIGS. 1 and 2 will be described together in detail.

The fan system 100 includes a fan mid shaft 102 that has a substantially circular cross-sectional shape. The fan mid shaft 102 is tubular between a first end 112 and an opposite second end 114 along a center axis 106. The fan mid shaft 102 has an inner diameter surface 108 and an outer diameter surface 110. In the illustrated embodiment, the inner diameter surface 108 and the outer diameter surface 110 are substantially concentric about the central axis 106. Additionally or alternatively, one or more of the inner diameter surface 108 or the outer diameter surface 110 may not be substantially concentric about the central axis 106, may have uniform or non-uniform cross-sectional shapes, may have uniform or non-uniform shapes along the length of the center axis 106, or the like. For example, the inner diameter surface 108 may have a polygon cross-sectional shape (e.g., rectangular, hexagonal, trapezoidal, or the like) and the outer diameter surface 110 may have a circular cross-sectional shape.

The fan mid shaft 102 is manufactured out of a steel alloy in one embodiment. For example, the shaft 102 may be manufactured out of any grade of heat treated and/or alloyed steel including, but not limited to, low-carbon steel, medium-carbon steel, high-carbon steel, or the like. For example, the shaft 102 may be manufactured of a coated low, medium, or high carbon steel with additional alloying elements that may include but are not limited to chromium, nickel, cobalt, molybdenum, aluminum, titanium, or the like. Additionally or alternatively, the shaft 102 may be manufactured out of another material such as alloys of titanium, nickel, or alternative elements. A coating is applied to the steel fan mid shaft 102. For example, the coating (not shown) may be a porous, non-sacrificial, non-dissolvable, and unburnished anti-corrosion coating material. A porous coating may have minute spaces or holes through which liquid or air may pass. A non-sacrificial coating may be a permanent or semi-permanent material that may withstand high temperatures, high humidity levels, or the like. A non-dissolvable coating may not be metabolized, melt, liquify, disintegrate, fade, or the like. An unburnished coating may be unpolished, dull, or the like. Additionally or alternatively, the coating may be another material having other properties. For example, the coating may be a non-porous material, the coating may be a sacrificial material, the coating may be a dissolvable material, the coating may be a burnished material, or the like. The coating may be applied to the all or a portion of the inner diameter surface 108 of the fan mid shaft 102, may be applied to all or a portion of the outer diameter surface 110, or any combination therein, in order to protect the steel material of the fan mid shaft 102.

In one or more embodiments, the fan mid shaft 102 may be used in one or more applications that may expose the coated steel shaft 102 to acidic environments. For example, the acidic environment may have one or more carboxylic acids (e.g., acetic acid, valeric acid, propionic acid, lactic acid, or the like), may be exposed to moist and/or dry environments, environments having chlorides or alternatively chemical species, or the like. Additionally or alternatively, the fan system 100 may be exposed to temperatures up to and including 100° F., up to and including 250° F., up to and including 500° F., up to and including 750° F., up to and including 1000° F., or the like.

A dry film lubricant 104 is applied to the inner diameter surface 108 of the fan mid shaft 102. The dry film lubricant 104 may be applied to at least a portion of the inner diameter surface 108, all of the inner diameter surface 108, or the like. For example, the dry film lubricant may be applied to the coated steel fan mid shaft 102, or may be applied to a non-coated steel fan mid shaft 102. Examples of non-limiting processes for applying the dry film lubricant 104 to the inner diameter surface 108 may include spraying, immersing, dipping, burnishing, or the like, with or without a subsequent high temperature curing process. Non-limiting examples of the chemical composition of the dry film lubricant may be lead based, lead free, molybdenum disulfide based (e.g., with or without the presence of graphite), polytetrafluoroethylene based (e.g., with or without the presence of graphite), a mix of molybdenum disulfide and polytetrafluoroethylene based (e.g., with or without the presence of graphite), tungsten disulfide based, or the like. Additionally, the dry film lubricant 104 may include graphite, may not include graphite, may be solvent based, may be water based, or the like. In one or more embodiments, the dry film lubricant 104 may be a hydrophobic dry film lubricant that may provide a hermetic seal on the porous coating that is disposed onto the inner diameter surface 108 of the shaft 102. For example, the dry film lubricant 104 may prevent, mitigate, or reduce a formation of cracks and/or an amount of corrosion on the inner diameter surface 108 of the shaft 102 relative to a system that is without a dry film lubricant. The preventing, mitigation, reduction, or the like, of the formation of cracks and an amount of corrosion will be discussed in detail below.

The fan mid shaft 102 is operably coupled with a fan 116 at the first end 112 of the shaft 102. Additionally, the fan mid shaft 102 is operably coupled with a low-pressure turbine 118 at the second end 114 of the shaft 102. For example, in the illustrated embodiment, the fan system 100 may be used in a turbine in order to transfer energy between the low-pressure turbine 118 and the fan 116. Additionally or alternatively, the fan system 100 may be operably coupled with one or more alternative components of a turbine, a pump, or any alternative system. For example, the fan mid shaft 102 may be disposed between and operably coupled with one or more static or dynamic components of any alternative system. In one or more embodiments, the fan mid shaft 102 may be exposed to torque loading conditions up to and including 5 kilonewton-meters (kN-m), 10 kN-m, 20 kN-m, 50 kN-m, or the like. Additionally or alternatively, the fan mid shaft 102 may be exposed to normal forces (e.g., sliding conditions) up to and including 1 kilonewton (kN), 2 kN, 5 kN, 10 kN, or the like.

The fan system 100 has a central vent tube 126 that is disposed inside of the fan mid shaft 102. The central vent tube 126 has a tubular shape between a first end 136 and a second end 138 of the central vent tube 126 along the center axis 106. Optionally, the central vent tube 126 may extend a uniform length as the fan mid shaft 102, may extend a length that is shorter than the length of the fan mid shaft 102, or the like. The central vent tube 126 may provide a pathway between the fan 116 and the low-pressure turbine 118 in order to remove the exhaust of leaked oil from the turbine.

In one or more embodiments, the central vent tube 126 may be manufactured out of a steel alloy. For example, the central vent tube 126 may be manufactured out of any grade of heat treated and/or alloyed steel including but not limited to low-carbon steel, medium-carbon steel, high-carbon steel, or the like. For example, the central vent tube 126 may be manufactured out of stainless steel, an alloy of titanium, or any alloy of an alternative element. Optionally, the central vent tube 126 and the fan mid shaft 102 may be manufactured out of uniform steel alloys or non-uniform steel alloys.

In one or more embodiments, the fan mid shaft 102 may be divided into three section lengths along the center axis 106 between the first and second ends 112, 114. The three segments include a forward-section 120 that is disposed near the first end 112 of the shaft 102, an aft-section 124 that is disposed near the second end 114 of the shaft 102, and a mid-section 122 that is disposed between the forward-section 120 and the aft-section 124 along the center axis 106. In the illustrated embodiment, the lengths of the forward-section 120, mid-section 122, and aft-section 124 are substantially uniform between the first and second ends 112, 114. Optionally, the fan mid shaft 102 may be divided into three non-uniform sections, less than three or more than three uniform or non-uniform sections, or any combination therein.

The central vent tube 126 is held in a position within the fan mid shaft 102 along the center axis 106 by one or more supports. For example, in the illustrated embodiment, the position of the central vent tube 126 within the fan mid shaft 102 is maintained by three supports 130, 132, 134 that are inserted into the shaft 102. Optionally, the position of the central vent tube 126 may be maintained by less than three or more than three supports. The supports 130, 132, 134 are sized and shaped to be inserted into the fan mid shaft 102. In the illustrated embodiment, the supports 130, 132, 134 are generally in the shape of rings. The supports 130, 132, 134 may be manufactured out of a metallic alloy such as titanium, steel, other high strength alloy configurations of nickel based or alternative alloys, or the like. Optionally, the supports 130, 132, 134 may include a coating that is disposed on an outer diameter surface 140 of the supports. For example, the coating may be a copper-nickel-indium coating, or an alternative coating having a low coefficient of friction such as a lubricant coating, and is applied to a portion or all of the outer diameter surface 140 of each of the supports 130, 132, 134.

The three supports include a forward support 130 that is disposed at the forward-section 120 of the shaft 102, a mid-support 132 that is disposed at the mid-section 122 of the shaft 102, and an aft support 134 that is disposed at the aft-section 124 of the shaft 102. The three supports 130, 132, 134 are inserted into the fan mid shaft 102 at the second end 114 of the shaft 102 and transferred in a direction A into the position at the forward-section 120, mid-section 122, and aft-section 124, respectively.

Inserting the supports involves a tribological contact between the outer diameter surfaces 140 of each of the supports and the inner diameter surface 108 of the fan mid shaft 102. For example, the supports 130, 132, 134 may be inserted into the fan mid shaft 102 by a torque load and/or compressive load application that may cause damage (e.g., crush, crack, compressive damage, or the like) to the inner diameter surface 108 of the fan mid shaft 102. The tribological contact may result in the formation of scratches, cracks, or the like, in the coated steel inner diameter surface 108 of the shaft 102. Additionally, the steel alloy of the fan mid shaft 102 may be subjected to a corrosion or chemical attack (e.g., galvanic corrosion) when the underlying steel alloy of the shaft 102 is exposed due to the formation of scratches, cracks, or the like. FIGS. 3 through 7 demonstrate that the dry film lubricant 104 improves the resistance of the fan mid shaft 102 to chemical attacks, electrochemical corrosion, oxidation, wear, or the like, relative to a fan system 100 that is devoid a dry film lubricant that is applied to the inner diameter surface 108 of the shaft 102. For example, the dry film lubricant may provide improved protection and/or resistance to the compressive loading of the supports 130, 132, 134 relative to a fan system that does not have a dry film lubricant applied to the inner diameter surface 108 of the fan mid shaft 102.

Figure 3:
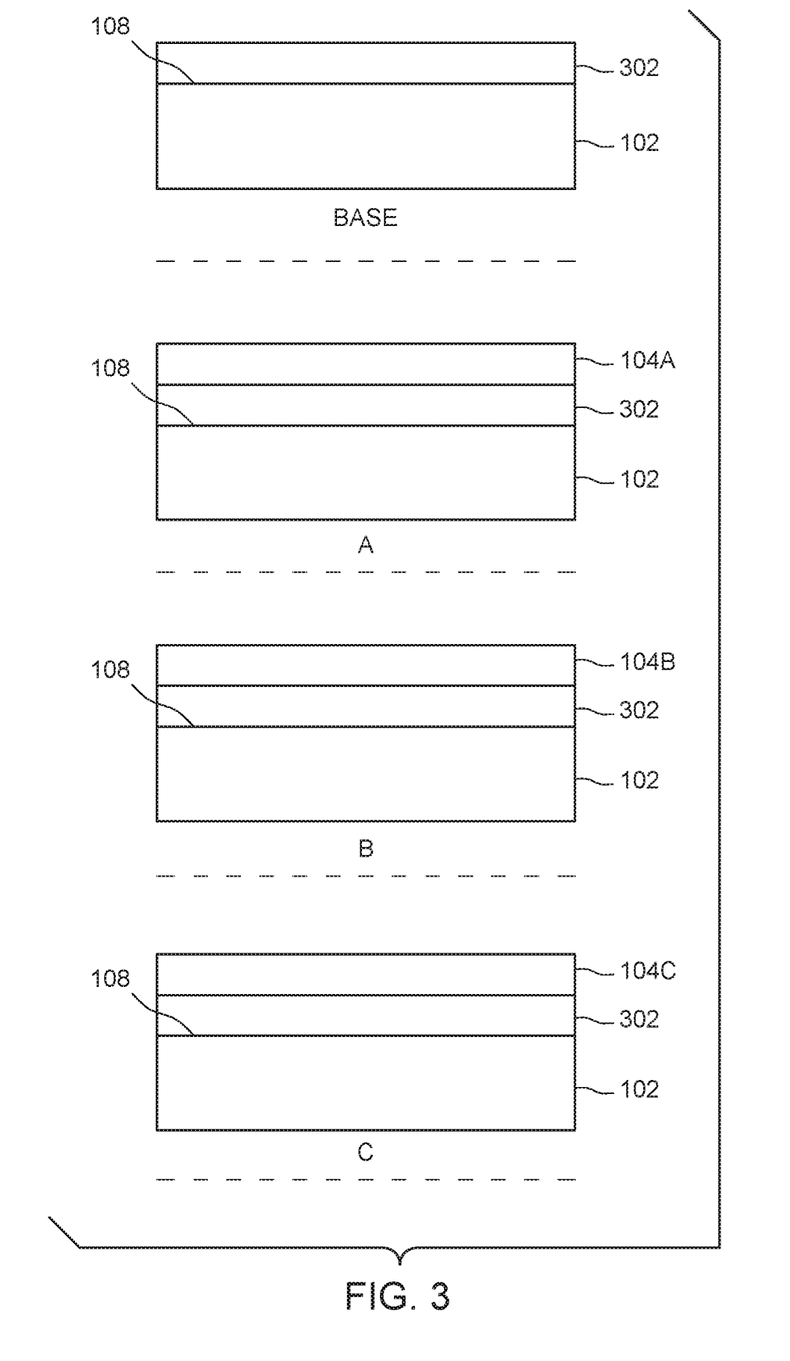
FIG. 3 illustrates cross-sectional views of a fan system in accordance with one embodiment.

FIG. 3 illustrates cross-sectional views of four embodiments of the fan system 100. The four embodiments illustrate four sample configurations of materials that are subject to scratch tests (results illustrated in FIG. 4) and corrosion tests (results illustrated in FIGS. 5, 6, and 7). A Base sample illustrates the steel fan mid shaft 102 with a coating 302 (e.g., anti-corrosion coating) that is applied to the inner diameter surface 108. For example, the Base sample is devoid a dry film lubricant. Sample A illustrates the steel fan mid shaft 102 with the coating 302 applied to the inner diameter surface 108 and a first dry film lubricant 104A that is applied to the coating 302. For example, the first dry film lubricant 104A may have a first chemical composition that includes a lead-based molybdenum disulfide. Sample B illustrates the steel fan mid shaft 102 with the coating 302 applied to the inner diameter surface 108 and a second dry film lubricant 104B that is applied to the coating 302. For example, the second dry film lubricant 104B may have a different chemical composition that includes a lead-free molybdenum disulfide (e.g., with or without additional alloying elements such as, but not limited to, antimony (Sb) or Sb-based compounds). Sample C illustrates the steel fan mid shaft 102 with the coating 302 applied to the inner diameter surface 108 and a third dry film lubricant 104C that is applied to the coating 302. For example, the third dry film lubricant 104C may have a different chemical composition that includes a <0.06% lead molybdenum disulfide (e.g., with or without additional alloying elements such as, but not limited to, antimony (Sb) or Sb-based compounds).

Optionally, in one or more embodiments, one or more of the Base, Sample A, Sample B, or Sample C may include an additional sealant (not shown) that may be applied to the coating 302. For example, a sealant may be applied between the coating 302 and the dry film lubricants 104A, 104B, 104C, respectively, of Samples A, B, and/or C. The sealant may be a non-porous sealant that provides a barrier against carbon deposits and extend the life of steel fan mid shaft 102 and the coating 302 relative to an embodiment that is devoid of the sealant.

The embodiments illustrated in FIGS. 3 through 7 illustrate four samples of materials that may be subject to scratch and corrosion tests. Additionally or alternatively, more than four or less than four sets of materials may be tested. Optionally, the dry film lubricants may have any alternative chemical compositions.

Each of the four samples are subject to a scratch test. A scratch indenter (not shown) applies a load ranging from 0 newtons (N) up to and including 1600 N to each of the four samples. The scratch indenter may be manufactured of the same metallic alloy, including a copper-nickel-indium coating (or another applied low-coefficient of friction coating), as the supports (130, 132, 134) in order to simulate the tribological contact between the outer diameter surface 140 of the supports 130, 132, 134 and the inner diameter surface 108 of the fan mid shaft 102 when the supports 130, 132, 134 are inserted into the fan mid shaft 102.

Figure 4:
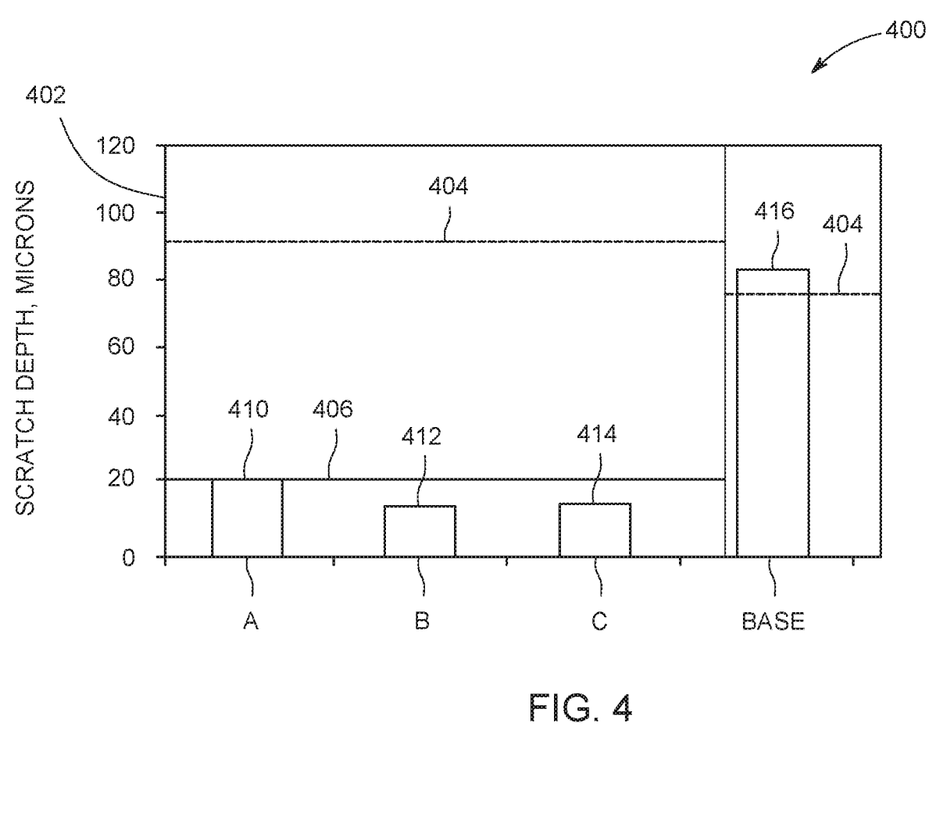
FIG. 4 illustrates a scratch depth graph in accordance with one embodiment.

FIG. 4 illustrates a scratch depth graph 400 in accordance with one embodiment. A vertical axis 402 is representative of a scratch depth magnitude (in microns) that is measured on each of the four samples (Base, A, B, C, and D of FIG. 3). A horizontal line 406 is representative of an average thickness of a dry film lubricant (104A, 104B, 104C) that is applied to the samples A, B, and C. For example, the average thickness of the dry film lubricant is about 20 microns. A horizontal line 404 is representative an average thickness of the coating 302 that is applied to the samples Base, A, B, and C. For example, the average thickness of the coating 302 is about 75 microns. The 75 microns thick coating 302 (illustrated as the solid horizontal line 404) is applied onto the 20 microns thick dry film lubricant of samples A, B, and C. Alternatively, the 75 microns thick coating 302 (illustrated as the dotted horizontal line 404) is applied to the bare inner diameter surface 108 of the fan mid shaft 102. At a depth greater than 75 microns, the steel material of the inner diameter surface 108 of the fan mid shaft 102 is reached (e.g., exposed). For example, when the bare steel material of the fan mid shaft 102 is exposed, the bare steel material may be subject to galvanic corrosion.

The sample A (e.g., the steel fan mid shaft, coating 302, and lead-based dry film lubricant 104A) has a first scratch depth 410 that is about 20 microns deep. For example, the first scratch depth 410 reaches a scratch depth that is substantially the same as the average thickness 406 of the dry film lubricant. The sample B (e.g., the steel fan mid shaft, coating 302, and lead-free dry film lubricant 104B) has a second scratch depth 412 that is about 12 microns deep. For example, the second scratch depth 412 is less than (e.g., not as deep, more shallow than) the average thickness 406 of the dry film lubricant. The scratch test performed on sample B does not reach or expose the coating 302 (e.g., at a depth greater than 20 microns). The sample C (e.g., the steel fan mid shaft, coating 302, and 0.06% lead dry film lubricant 104C) has a third scratch depth 414 that is about 14 microns deep. For example, the third scratch depth 414 is less than (e.g., not as deep, more shallow than) the average thickness 406 of the dry film lubricant. The scratch test performed on sample C does not reach or expose the coating 302 (e.g., at a depth greater than 20 microns). The Base sample (e.g., the steel fan mid shaft and coating 302) has a base scratch depth 416 that is about 85 microns deep. For example, the base scratch depth 416 is greater than (e.g., deeper than) the average thickness 404 of the coating 302. The scratch test performed on the Base sample reaches and exposes the bare steel material (e.g., the base scratch depth 416 is greater/deeper than 75 microns) of the fan mid shaft 102. Graph 400 illustrates that the dry film lubricants 104A, 104B, and 104C provide an improved scratch resistance to the indenter relative to the Base sample that does not have a dry film lubricant. For example, the dry film lubricant reduces a depth of a scratch that is disposed on the inner diameter surface 108 of the shaft 102 relative to a system that is without the dry film lubricant.

Figure 5:
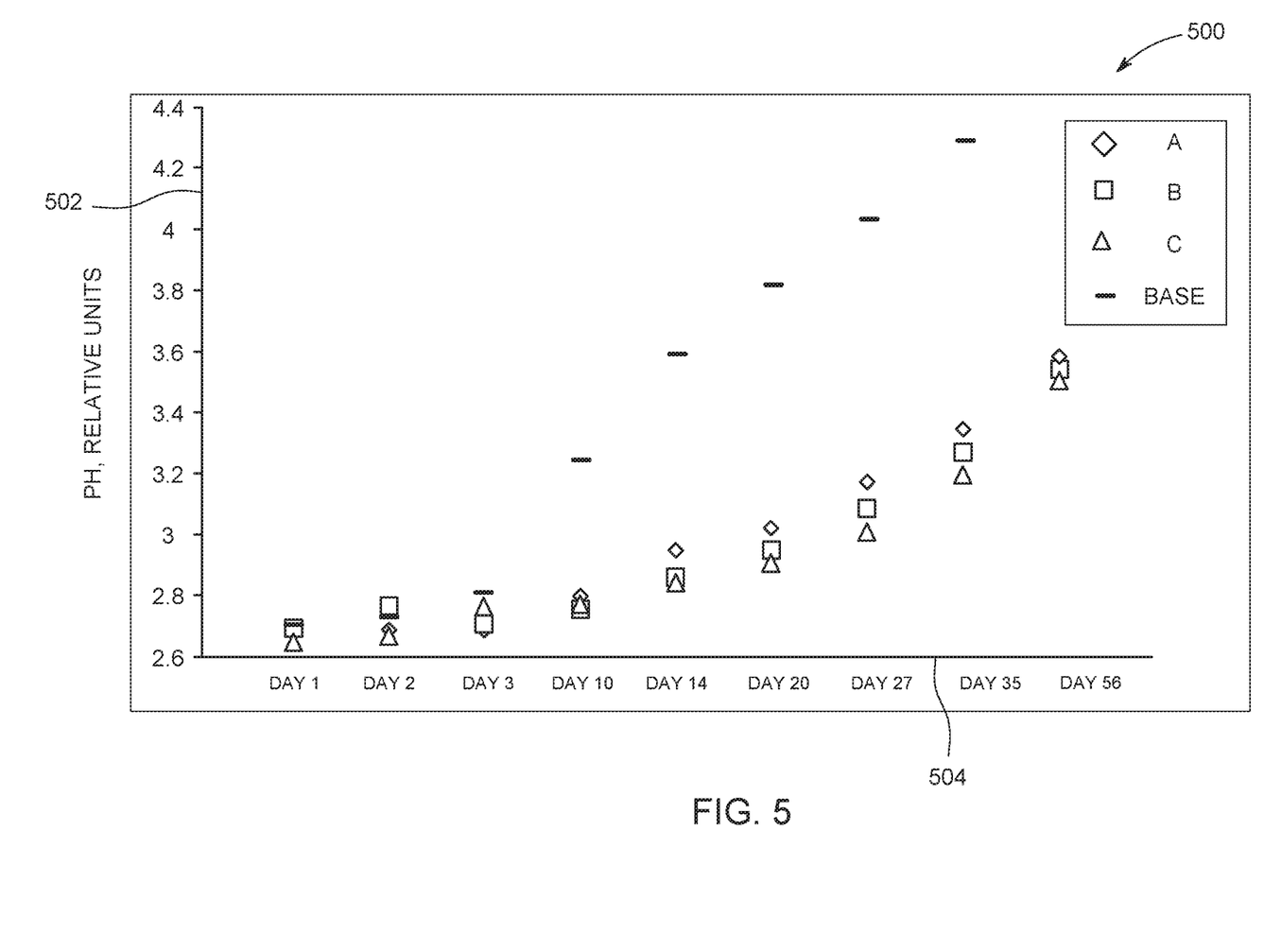
FIG. 5 illustrates a pH concentration graph indicating a corrosion rate in accordance with one embodiment.
Figure 6:
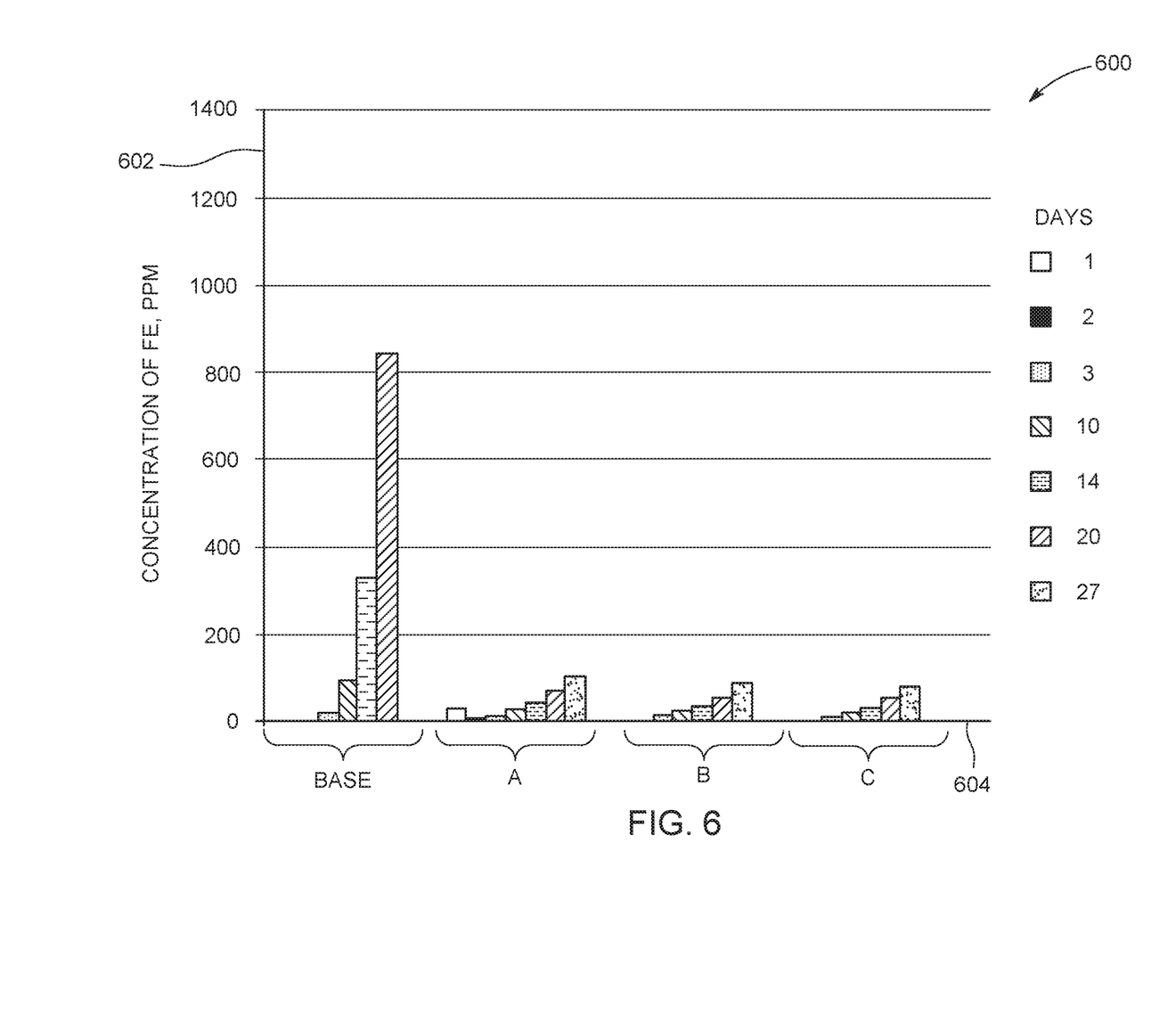
FIG. 6 illustrates a concentration graph indicating a corrosion rate in accordance with one embodiment.
Figure 7:
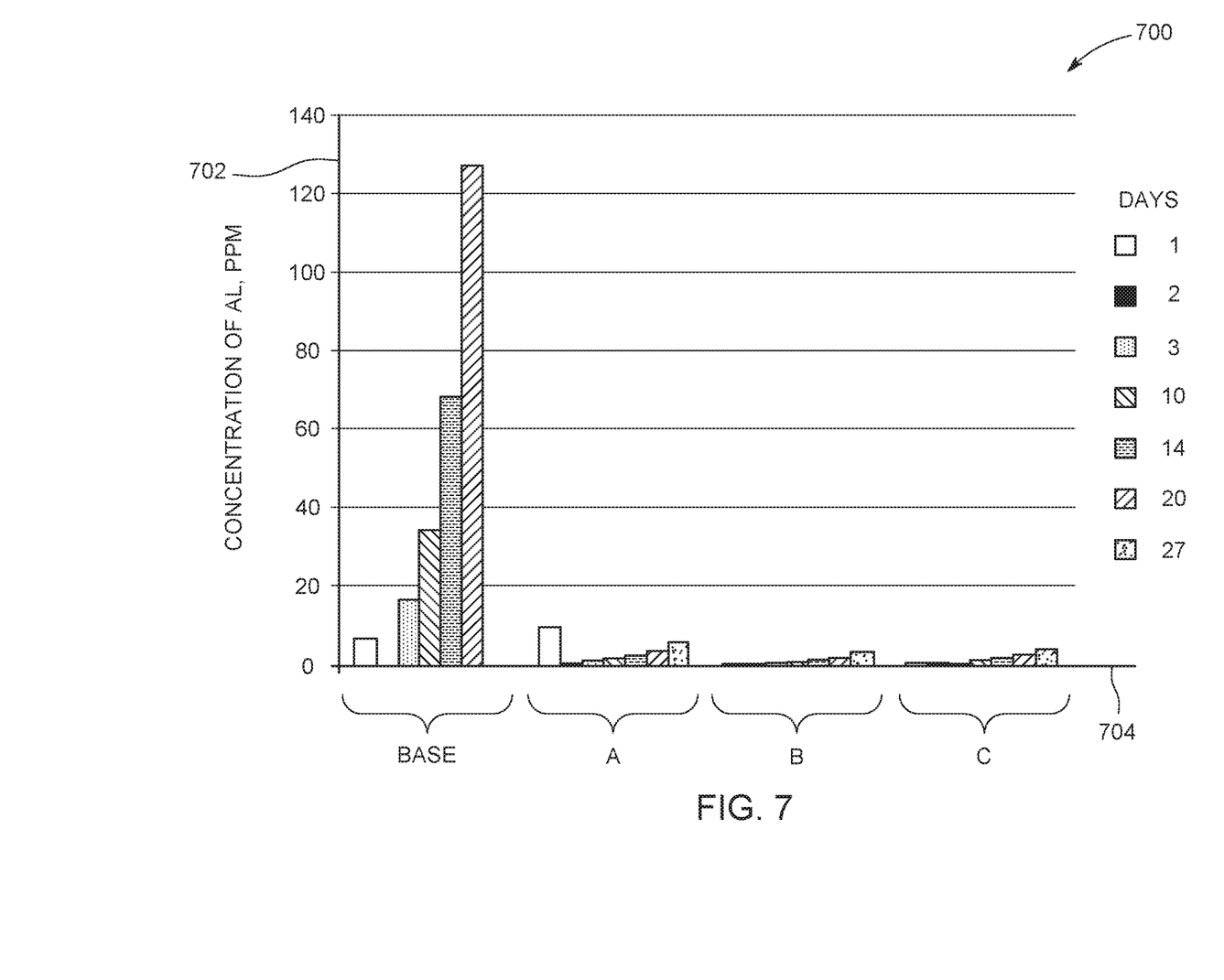
FIG. 7 illustrates a corrosion graph in accordance with one embodiment.

Each of the four samples (e.g., new samples that were not used in the scratch test) are also subject to a corrosion test. A scribe that has a scribe depth of at least 140 microns is made on each of the four samples A, B, C, and Base. For example, the scribe depth reaches (e.g., exposes) the base steel material of the fan mid shaft 102. The samples are individually immersed and maintained in a 1 wt % acetic acid solution. Additionally or alternatively, the samples may be immersed in an alternative acidic solution that may be prepared in an aqueous medium, oil, or a combination of both, at room temperature and/or at elevated temperatures up to and including 800° F. FIGS. 5, 6 and 7 illustrate the results of the samples A, B, C and Base that are subjected to the corrosion test.

FIG. 5 illustrates a pH corrosion graph 500 in accordance with one embodiment. A vertical axis 502 is representative of relative units of pH, and a horizontal axis 504 is representative of time (e.g., days). An increase in the pH level of the acidic solution corresponds to an increase in corrosion activity. The corrosion graph 500 illustrates that as the time increases, the pH level of the Base sample is greater than the pH level of samples A, B, and C. For example, at day 3, the pH level for each sample (Base, A, B, and C) is from about 2.5 to 2.8. At day 14, the pH level for the samples A, B and C is about 2.9, and the pH level for the Base sample is about 3.7. Samples A, B, and C, having the dry film lubricant, have a lower increase in pH relative to the Base sample that is without a dry film lubricant. For example, the amount of corrosive activity in the samples that include dry film lubricant increases slower than the corrosive activity in the Base sample that does not include a dry film lubricant.

FIG. 6 illustrates an iron (Fe) release concentration graph 600 indicating corrosion activity and rate of corrosion in accordance with one embodiment. A vertical axis 602 is representative of a concentration of released of iron (Fe) measured in parts per million (ppm) in the acidic solution. A horizontal axis 604 is representative of measurements of each of the samples A, B, C and the Base sample over time (days). A greater level of concentration of iron (Fe) that is measured in the acidic solution is representative of increasing amounts of corrosion activity of the steel fan mid shaft.

The measured amount of Fe in the acidic solution in which the Base sample is immersed in at day 10 is about 100 ppm, at day 14 the measured amount of Fe is about 325 ppm, and at day 20 the measured amount of Fe is about 850 ppm. Alternatively, the measured amount of Fe in the acidic solution in which the sample A is immersed in at day 10 is about 25 ppm, at day 14 the measured amount of Fe is about 50 ppm, and at day 20 the measured amount of Fe is about 75 ppm. The measured amount of Fe (e.g., the release of Fe into the acidic solution) in the acidic solution in which the samples A, B and C are immersed is less than 100 ppm up to at least day 27. Alternatively, the measured amount of Fe in the acidic solution in which the Base sample is immersed is greater than 800 ppm up to at least day 20. The measured amount of Fe that is released in the acidic solution of samples A, B and C is less than the measured amount of Fe that is released in the acidic solution of the Base sample. For example, the graph 600 illustrates that a fan mid shaft that has a dry film lubricant applied to the coated steel surface of the shaft reduces the amount of galvanic corrosion activity relative to a fan mid shaft that is devoid a dry film lubricant applied to the coated steel material of the shaft.

FIG. 7 illustrates an aluminum (Al) release concentration graph 700 indicating corrosion activity and rate of corrosion in accordance with one embodiment. A vertical axis 702 is representative of a concentration of released Aluminum (Al) measured in parts per million (ppm) in the acidic solution. A horizontal axis 704 is representative of measurements of each of the samples A, B, C and the Base sample over time (days). A greater level of concentration of aluminum (Al) that is measured in the acidic solution is representative of increasing amounts of corrosion activity of the coating (e.g., coating 302).

The measured amount of Al in the acidic solution in which the Base sample is immersed in at day 10 is about 35 ppm, at day 14 the measured amount of Fe is about 65 ppm, and at day 20 the measured amount of Fe is about 130 ppm. Alternatively, the measured amount of Al in the acidic solution in which the sample A is immersed in at day 10 is about 2 ppm, at day 14 the measured amount of Al is about 3 ppm, and at day 20 the measured amount of Al is about 5 ppm. The measured amount of Al (e.g., the release of Al into the acidic solution) in the acidic solution in which the samples A, B and C are immersed is less than 10 ppm up to at least day 27. Alternatively, the measured amount of Al in the acidic solution in which the Base sample is immersed is greater than 120 ppm up to at least day 20. The measured amount of Al that is released in the acidic solution of samples A, B and C is less than the measured amount of Al that is released in the acidic solution of the Base sample. For example, the graph 700 illustrates that a fan mid shaft that has a dry film lubricant applied to the coated steel surface of the shaft reduces the amount of galvanic corrosion activity to the coating relative to a fan mid shaft that is devoid a dry film lubricant applied to the coated steel material of the shaft.

FIGS. 5 through 7 illustrate that the dry film lubricant 104 that is applied to the inner diameter surface 108 of the coated steel material of the fan mid shaft 102 reduces an amount of corrosion on the inner diameter surface 108 of the fan mid shaft 102 relative to a system that is without a dry film lubricant. For example, the higher values of the measured amounts of Fe and Al released in the acidic solution of the Base sample relative to the lower values of the measured amounts of Fe and Al released in the acidic solutions of the samples A, B, and C indicate that the dry film lubricant mitigates corrosion activity on the coated steel material of the fan mid shaft 102. For example, the dry film lubricant increases a durability of the coated steel material relative to a coated steel material that is without a dry film lubricant.

In one embodiment of the subject matter described herein, a fan system of a turbine includes a fan mid shaft made of a coated steel material configured to extend along a center axis of a turbine. The fan mid shaft having an inner diameter surface. The fan system includes a dry film lubricant that is configured to be applied to at least a portion of the inner diameter surface of the fan mid shaft.

Optionally, the dry film lubricant is a lead-free dry film lubricant.

Optionally, the fan system includes a central vent tube and one or more supports configured to be inserted into the shaft. The one or more supports are configured to maintain a position of the central vent tube within the shaft. Optionally, the one or more supports are configured to be disposed at one or more positions within the shaft along the center axis of the turbine.

Optionally, the one or more supports include a forward support, a mid-support, and an aft support. The forward support is disposed at a forward-section of the shaft, the mid-support is disposed at a mid-section of the shaft, and the aft support is disposed at an aft section of the shaft.

Optionally, the shaft is configured to be made of one or more of coated low-carbon steel, coated medium-carbon steel, or coated high-carbon steel.

Optionally, the fan system includes a scratch disposed on the inner diameter surface of the shaft. The dry film lubricant is configured to reduce a depth of the scratch disposed on the inner diameter surface of the shaft relative to a system without the dry film lubricant.

Optionally, the dry film lubricant is configured to reduce an amount of galvanic corrosion on the inner diameter surface of the shaft relative to a system without the dry film lubricant.

Optionally, the fan system includes a fan and a low-pressure turbine. The shaft is operably coupled with the fan at a forward-section of the shaft, and the shaft is operably coupled to the low-pressure turbine at an aft-section of the shaft.

Optionally, the dry film lubricant is one or more of molybdenum disulfide, polytetrafluoroethylene, or a combination of molybdenum disulfide and polytetrafluoroethylene.

In one embodiment of the subject matter described herein, a method includes applying a dry film lubricant to at least a portion of an inner diameter surface of a fan mid shaft that extends along a center axis of a turbine. The fan mid shaft is configured to be made of a coated steel material. The dry film is configured to one or more of prevent scratch formation on the inner diameter surface of the shaft or mitigate galvanic corrosion on the inner diameter surface of the shaft.

Optionally, the dry film lubricant is a lead-free dry film lubricant.

Optionally, the method includes maintaining a position of a central vent tube within the fan mid shaft with one or more supports. Optionally, the method includes disposing the one or more supports at one or more positions within the shaft along the center axis of the turbine.

Optionally, the method includes disposing a forward support of the one or more supports at a forward-section of the shaft, disposing a mid-support of the one or more supports at a mid-section of the shaft, and disposing an aft support of the one or more supports at an aft-section of the shaft.

Optionally, the shaft is made of one or more of coated low-carbon steel, coated medium-carbon steel, or coated high-carbon steel.

Optionally, the method includes reducing a depth of a scratch disposed on the inner diameter surface of the shaft with the dry film lubricant relative to a system without the dry film lubricant.

Optionally, the method includes reducing an amount of galvanic corrosion on the inner diameter surface of the shaft relative to a system without the dry film lubricant.

Optionally, the method includes operably coupling a fan with the shaft at a forward-section of the shaft, and operably coupling a low-pressure turbine with the shaft at an aft-section of the shaft.

Optionally, thy dry film lubricant is one or more of molybdenum disulfide, polytetrafluoroethylene, or a combination of molybdenum disulfide and polytetrafluoroethylene.

In one embodiment of the subject matter described herein, a fan system of a turbine includes a fan mid shaft made of a coated steel material configured to extend along a center axis. The fan mid shaft has an inner diameter surface. The fan system includes a central vent tube that is configured to be inserted into the shaft to a position, wherein the position of the central vent tube is configured to be maintained by one or more supports that are disposed at one or more positions within the shaft along the center axis. The fan system includes a dry film lubricant that is applied to at least a portion of the inner diameter surface of the fan mid shaft.

As used herein, an element or step recited in the singular and proceeded with the word "a" or "an" should be understood as not excluding plural of said elements or steps, unless such exclusion is explicitly stated. Furthermore, references to "one embodiment" of the presently described subject matter are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the subject matter set forth herein without departing from its scope. While the dimensions and types of materials described herein are intended to define the parameters of the disclosed subject matter, they are by no means limiting and are exemplary embodiments. Many other embodiments will be apparent to those of skill in the art upon reviewing the above description. The scope of the subject matter described herein should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose several embodiments of the subject matter set forth herein, including the best mode, and also to enable a person of ordinary skill in the art to practice the embodiments of disclosed subject matter, including making and using the devices or systems and performing the methods. The patentable scope of the subject matter described herein is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. A fan system of a turbine, the fan system comprising:
a fan mid shaft extending along a center axis of the turbine, the fan mid shaft having an inner diameter surface;
a coating system disposed on the inner diameter surface of the fan mid shaft, the coating system including an anti-corrosion coating disposed on the inner diameter surface of the fan mid shaft, a dry film lubricant, and a sealant disposed between at least a portion of the anti-corrosion coating and the dry film lubricant; and
one or more supports configured to maintain a position of a central vent tube within the fan mid shaft, wherein the one or more supports are configured to be in contact with the coating system inside the fan mid shaft, and wherein an outer diameter surface of the one or more supports includes a coating, the coating disposed between the outer diameter surface of the one or more supports and the inner diameter surface of the fan mid shaft.

2. The fan system of claim 1, wherein the dry film lubricant is a lead-free dry film lubricant.

3. The fan system of claim 1, wherein the one or more supports are configured to be disposed at one or more positions within the fan mid shaft along the center axis of the turbine.

4. The fan system of claim 1, wherein the one or more supports include a forward support, a mid-support, and an aft support, wherein the forward support is configured to be disposed at a forward-section of the fan mid shaft, wherein the mid-support is configured to be disposed at a mid-section of the fan mid shaft, and wherein the aft support is configured to be disposed at an aft-section of the fan mid shaft.

5. The fan system of claim 1, wherein the fan mid shaft is made of one or more of coated low-carbon steel, coated medium-carbon steel, or coated high-carbon steel.

6. The fan system of claim 1, wherein the one or more supports are configured to be inserted into the fan mid shaft, wherein one or more of the one or more supports are configured to form a scratch on the inner diameter surface of the fan mid shaft responsive to the one or more supports being inserted into the fan mid shaft, wherein the coating system including the anti-corrosion coating, the dry film lubricant, and the sealant is configured to reduce a depth of the scratch on the inner diameter surface of the fan mid shaft relative to a system without the anti-corrosion coating, the dry film lubricant, and the sealant of the coating system.

7. The fan system of claim 1, wherein the coating system is configured to reduce an amount of galvanic corrosion on the inner diameter surface of the fan mid shaft relative to a system without the coating system.

8. The fan system of claim 1, further comprising a fan and a low-pressure turbine, wherein the fan mid shaft is configured to be operably coupled with the fan at a forward-section of the fan mid shaft, and the fan mid shaft is configured to be operably coupled to the low-pressure turbine at an aft-section of the fan mid shaft.

9. The fan system of claim 1, wherein the dry film lubricant is one or more of molybdenum disulfide, polytetrafluoroethylene, or a combination of molybdenum disulfide and polytetrafluoroethylene.

10. A method comprising:
applying a coating system to an inner diameter surface of a fan mid shaft that extends along a center axis of a turbine, the fan mid shaft is to be made of a coated steel material, the coating system including an anti-corrosion coating disposed on the inner diameter surface of the fan mid shaft, a dry film lubricant, and a sealant disposed between at least a portion of the anti-corrosion coating and the dry film lubricant; and
inserting one or more supports into the fan mid shaft, the one or more supports configured to maintain a position of a central vent tube within the fan mid shaft, wherein the one or more supports are configured to contact the coating system inside the fan mid shaft, and wherein an outer diameter surface of the one or more supports includes a coating, the coating disposed between the outer diameter surface of the one or more supports and the inner diameter surface of the fan mid shaft.

11. The method of claim 10, wherein the dry film lubricant is a lead-free dry film lubricant.

12. The method of claim 10, further comprising disposing the one or more supports at one or more positions within the fan mid shaft along the center axis of the turbine.

13. The method of claim 10, further comprising disposing a forward support of the one or more supports at a forward-section of the fan mid shaft, disposing a mid-support of the one or more supports at a mid-section of the fan mid shaft, and disposing an aft support of the one or more supports at an aft-section of the fan mid shaft.

14. The method of claim 10, wherein the fan mid shaft is made of one or more of coated low-carbon steel, coated medium-carbon steel, or coated high-carbon steel.

15. The method of claim 10, wherein one or more of the supports are configured to form a scratch on the inner diameter surface of the fan mid shaft responsive to the one or more supports being inserted into the fan mid shaft, wherein the coating system including the anti-corrosion coating, the dry film lubricant, and the sealant is configured to reduce a depth of the scratch disposed on the inner diameter surface of the fan mid shaft relative to a system without the anti-corrosion coating, the dry film lubricant, and the sealant of the coating system.

16. The method of claim 10, further comprising reducing an amount of galvanic corrosion on the inner diameter surface of the fan mid shaft relative to a system without the coating system.

17. The method of claim 10, wherein the dry film lubricant is one or more of molybdenum disulfide, polytetrafluoroethylene, or a combination of molybdenum disulfide and polytetrafluoroethylene.

18. A fan system of a turbine, the fan system comprising:
a fan mid shaft extending along a center axis, the fan mid shaft having an inner diameter surface;
a coating system disposed on the inner diameter surface of the fan mid shaft, the coating system including an anti-corrosion coating disposed on the inner diameter surface of the fan mid shaft, a dry film lubricant applied to at least a portion of the anti-corrosion coating, and a sealant disposed between at least a portion of the anti-corrosion coating and the dry film lubricant; and
one or more supports configured to maintain a position of a central vent tube within the fan mid shaft, wherein the one or more supports are configured to contact the coating system inside the fan mid shaft,
wherein the one or more supports are configured to be inserted into the fan mid shaft, wherein one or more of the one or more supports are configured to form a scratch on the inner diameter surface of the fan mid shaft responsive to the one or more supports being inserted into the fan mid shaft, wherein the coating system including the anti-corrosion coating, the dry film lubricant, and the sealant is configured to reduce a depth of the scratch on the inner diameter surface of the fan mid shaft relative to a fan system without the anti-corrosion coating, the dry film lubricant, and the sealant of the coating system, and
wherein an outer diameter surface of the one or more supports includes a coating, the coating disposed between the outer diameter surface of the one or more supports and the inner diameter surface of the fan mid shaft.

19. The fan system of claim 18, wherein the fan mid shaft is made of one or more of coated low-carbon steel, coated medium-carbon steel, or coated high-carbon steel.

20. The fan system of claim 19, wherein the dry film lubricant is one or more of molybdenum disulfide, polytetrafluoroethylene, or a combination of molybdenum disulfide and polytetrafluoroethylene.

\* \* \* \* \*